US009129583B2

(12) United States Patent
Little et al.

(10) Patent No.: US 9,129,583 B2
(45) Date of Patent: Sep. 8, 2015

(54) SYSTEMS AND METHODS OF NOTE EVENT ADJUSTMENT

(71) Applicant: Apple Inc., Cupertino, CA (US)

(72) Inventors: Alexander H. Little, Woodside, CA (US); Tobias Manuel Hermann, Hamburg (DE); Clemens Homburg, Hamburg (DE)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 13/787,723

(22) Filed: Mar. 6, 2013

(65) Prior Publication Data

US 2013/0233155 A1 Sep. 12, 2013

Related U.S. Application Data

(60) Provisional application No. 61/607,579, filed on Mar. 6, 2012.

(51) Int. Cl.
*A63H 5/00* (2006.01)
*G09B 15/00* (2006.01)
(Continued)

(52) U.S. Cl.
CPC .............. *G10H 1/0033* (2013.01); *G09B 15/02* (2013.01); *G10H 1/00* (2013.01); *G10H 1/0008* (2013.01); *G10H 1/0016* (2013.01); *G10H 1/0041* (2013.01); *G10H 1/0066* (2013.01); *G10H 1/38* (2013.01); *G10H 7/00* (2013.01);
(Continued)

(58) Field of Classification Search
CPC ..... G10H 1/00; G10H 1/0041; G10H 1/0008; G10H 1/38; G10H 7/00; G09B 15/02

USPC ............... 84/609, 477 R, 483.2, 600, 613
See application file for complete search history.

(56) References Cited

U.S. PATENT DOCUMENTS 5,502,274 A * 3/1996 Hotz ............................. 84/613
5,792,971 A * 8/1998 Timis et al. ................... 84/609
(Continued)

FOREIGN PATENT DOCUMENTS

EP          1089254 A1     4/2001

OTHER PUBLICATIONS

Anderton, Craig "Introducing Sonar 7's Step Sequencer", Jan. 4, 2008, pp. 3.
(Continued)

*Primary Examiner* — David Warren
*Assistant Examiner* — Christina Schreiber
(74) *Attorney, Agent, or Firm* — Kilpatrick Townsend & Stockton LLP

(57) ABSTRACT

A graphical user interface (GUI) for an audio editing application enables a user to easily and conveniently shift a temporal and/or pitch of a sequence of note events within a musical piece, e.g., via a touch-sensitive display. The GUI displays a set of note events on a matrix grid and a subset of the note events (e.g., selected by the user) on a note events grid that overlaps the matrix grid. The note events grid is moveable with respect to the matrix grid such that the subset of note events is shifted against the remaining note events while the note events within the subset maintain a spatial relationship with respect to each other. Further, the user can shift the note events grid (and the note events therein) to any location within the matrix grid, without unintentionally snapping the note events to a nearest grid location on the matrix grid.

20 Claims, 20 Drawing Sheets

(51) Int. Cl.
*G09B 15/02* (2006.01)
*G10H 1/00* (2006.01)
*G10H 1/38* (2006.01)
*G10H 7/00* (2006.01)

(52) U.S. Cl.
CPC ........ *G10H 7/008* (2013.01); *G10H 2220/091* (2013.01); *G10H 2220/096* (2013.01); *G10H 2220/101* (2013.01); *G10H 2220/126* (2013.01); *G10H 2230/015* (2013.01)

(56) References Cited

U.S. PATENT DOCUMENTS

| | | | | |
|---|---|---|---|---|
| 5,886,273 | A * | 3/1999 | Haruyama | 84/478 |
| 6,084,171 | A * | 7/2000 | Kay | 84/613 |
| 6,103,964 | A * | 8/2000 | Kay | 84/611 |
| 6,166,313 | A * | 12/2000 | Miyamoto | 84/477 R |
| 6,897,367 | B2 * | 5/2005 | Leach | 84/609 |
| 6,987,220 | B2 * | 1/2006 | Holcombe | 84/483.2 |
| 7,273,979 | B2 * | 9/2007 | Christensen | 84/615 |
| 7,291,779 | B2 * | 11/2007 | Hasebe | 84/477 R |
| 7,365,261 | B2 * | 4/2008 | Hirano | 84/600 |
| 7,442,870 | B2 | 10/2008 | Lengeling et al. | |
| 7,692,088 | B2 * | 4/2010 | Umeyama et al. | 84/627 |
| 7,754,955 | B2 | 7/2010 | Egan | |
| 7,767,895 | B2 * | 8/2010 | Johnston | 84/483.2 |
| 7,790,974 | B2 | 9/2010 | Sherwani et al. | |
| 7,928,310 | B2 | 4/2011 | Georges et al. | |
| 7,982,115 | B2 * | 7/2011 | Johnston | 84/483.2 |
| 8,035,020 | B2 * | 10/2011 | Taub et al. | 84/600 |
| 8,046,688 | B2 | 10/2011 | Adams et al. | |
| 8,367,922 | B2 * | 2/2013 | Jung et al. | 84/610 |
| 8,829,322 | B2 * | 9/2014 | Walmsley | 84/611 |
| 2002/0170415 | A1 | 11/2002 | Hruska et al. | |
| 2004/0070621 | A1 * | 4/2004 | Suzuki et al. | 345/764 |
| 2005/0061141 | A1 * | 3/2005 | Yamauchi | 84/600 |
| 2006/0230910 | A1 | 10/2006 | Song et al. | |
| 2007/0044639 | A1 * | 3/2007 | Farbood et al. | 84/609 |
| 2008/0141849 | A1 * | 6/2008 | Johnston | 84/483.2 |
| 2009/0114079 | A1 * | 5/2009 | Egan | 84/477 R |
| 2009/0258700 | A1 * | 10/2009 | Bright et al. | 463/31 |
| 2010/0251875 | A1 * | 10/2010 | Johnston | 84/483.2 |
| 2010/0307321 | A1 * | 12/2010 | Mann et al. | 84/613 |
| 2011/0011243 | A1 * | 1/2011 | Homburg | 84/612 |
| 2011/0146479 | A1 * | 6/2011 | Shrem et al. | 84/645 |
| 2011/0191674 | A1 * | 8/2011 | Rawley et al. | 715/702 |
| 2011/0283869 | A1 | 11/2011 | Johnson | |
| 2012/0014673 | A1 * | 1/2012 | O'Dwyer | 386/282 |
| 2012/0312145 | A1 * | 12/2012 | Kellett et al. | 84/613 |
| 2013/0233154 | A1 * | 9/2013 | Little et al. | 84/609 |
| 2013/0233155 | A1 * | 9/2013 | Little et al. | 84/609 |
| 2013/0305904 | A1 * | 11/2013 | Sumi | 84/609 |
| 2013/0305905 | A1 * | 11/2013 | Barkley et al. | 84/609 |

OTHER PUBLICATIONS

International Search Report and Written Opinion for PCT Application No. PCT/US2013/029468, mailed Jun. 18, 2013, 13 pages.
International Preliminary Report on Patentability for PCT Application No. PCT/US2013/029468, mailed Sep. 18, 2014, 8 pages.
Non-Final Office Action for U.S. Appl. No. 13/787,717, mailed Nov. 24, 2014, 14 pages.

* cited by examiner

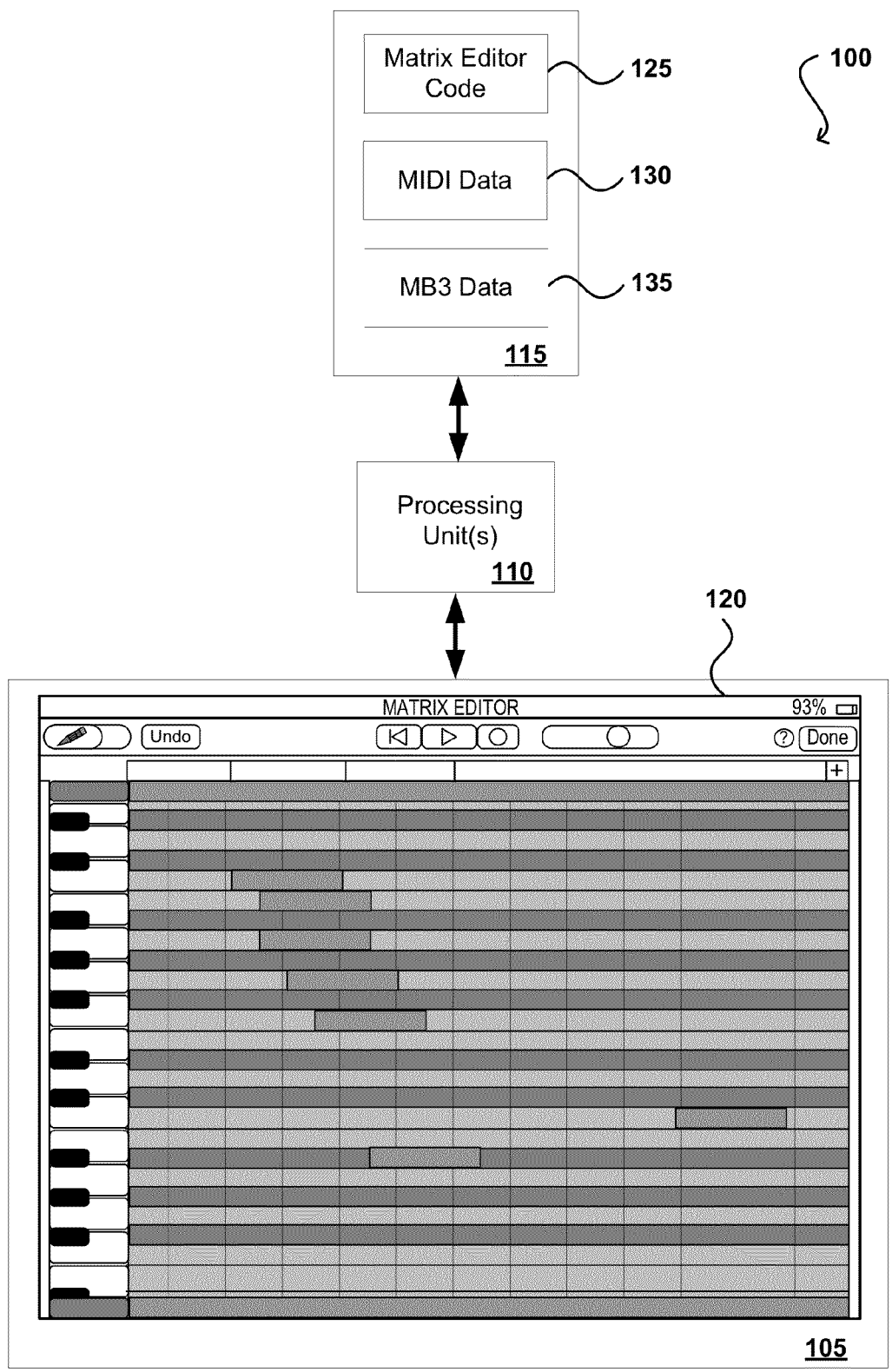

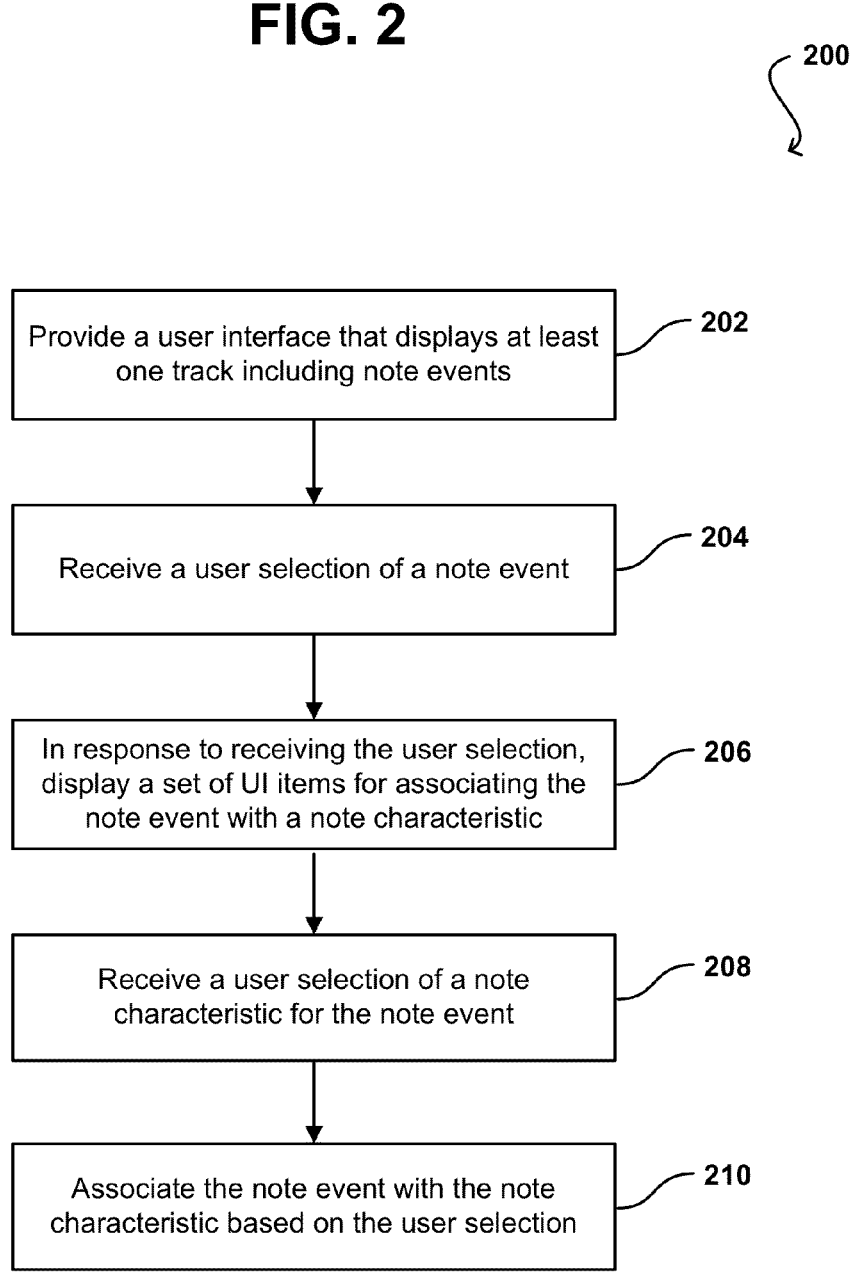

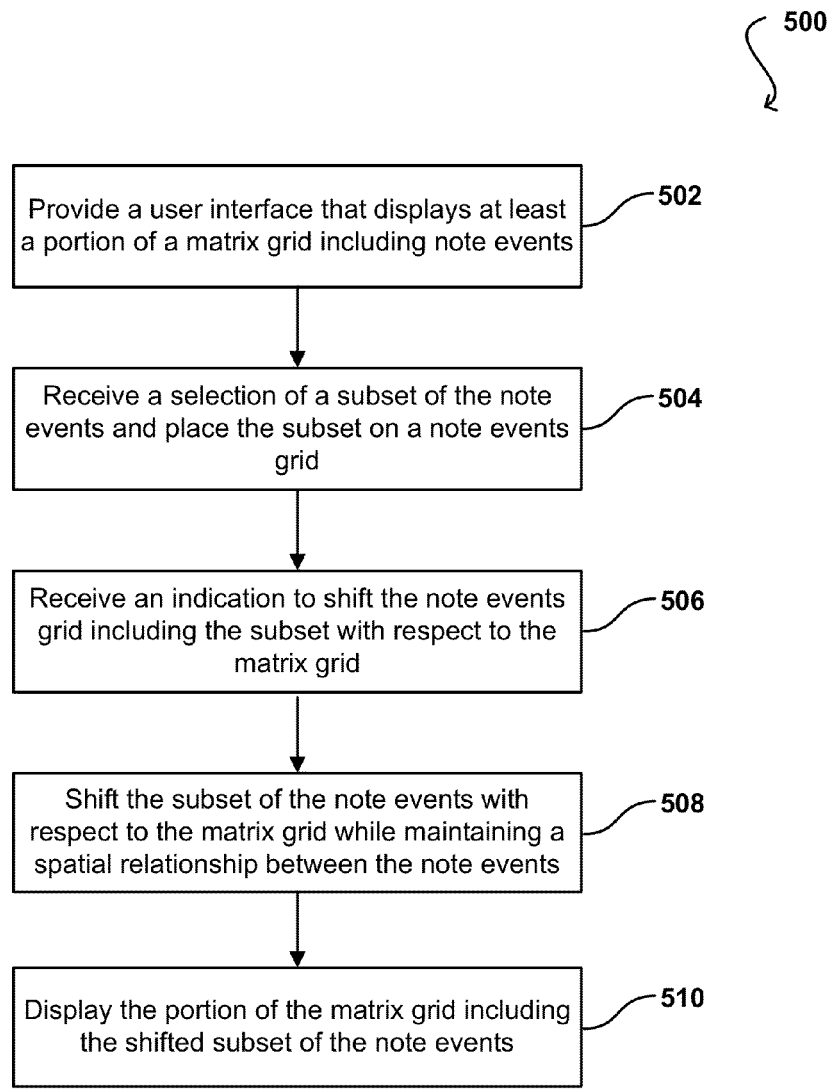

SYSTEMS AND METHODS OF NOTE EVENT ADJUSTMENT

CROSS-REFERENCES TO RELATED APPLICATIONS

This application claims priority to and the benefit of U.S. Provisional Application No. 61/607,579, filed Mar. 6, 2012 and entitled "Editing Application," the entire disclosure of which is herein incorporated by reference for all purposes.

BACKGROUND

Music editing applications allow music composers, media artists, and other users to create and edit a musical performance stored as Musical Instrument Digital Interface (MIDI) data. Users can import MIDI data files or compose musical pieces stored as MIDI data and use tools provided by the music editing application to edit the sequences of notes in the MIDI data. For example, a graphical user interface (GUI) of such a music editing application can allow users to modify one or more characteristics of the MIDI data, such as the pitch, the timing, the duration, and the velocity (or "loudness") of the sequences of recorded notes in the MIDI files. MIDI data does not have the ability to carry all of the data that is required to reproduce all of the playing characteristics of a musical instrument. A printed score encounters the same problem.

BRIEF DESCRIPTION OF THE DRAWINGS

FIG. 1 illustrates an example of a music editing system of some embodiments that can enable a user to compose and edit music using a music editing application.

FIG. 2 illustrates an example process of some embodiments for enabling a user to edit a characteristic of a note event in a music editing application.

FIG. 5 illustrates an example process of some embodiments for enabling a user to shift a segment of note events to a different location within a matrix grid in a music editing application.

DETAILED DESCRIPTION

Figure 3A:
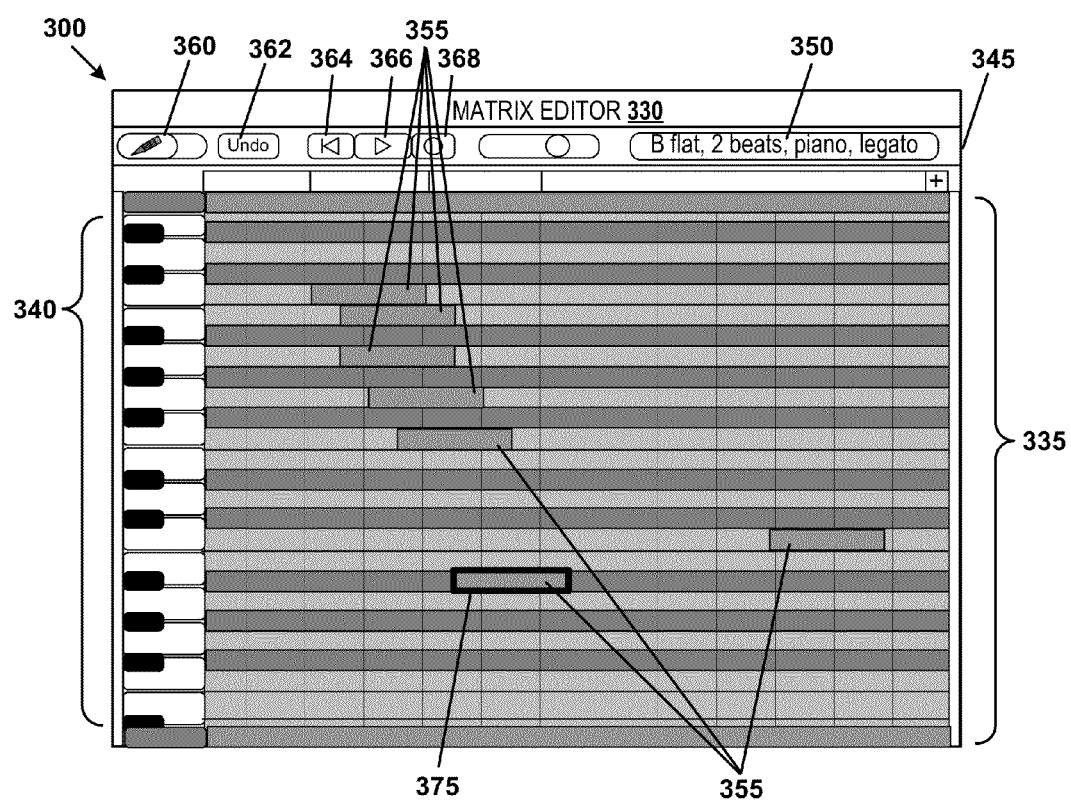
FIGS. 3A-3E shows an example sequence of screen images for editing a characteristic of a note event in a music editing application in accordance with some embodiments.

In the following description, for the purposes of explanation, specific details are set forth in order to provide a thorough understanding of embodiments of the invention. However, it will be apparent that the invention may be practiced without these specific details.

Certain embodiments of the invention provide a music editing application that enables a user to create and edit music or Musical Instrument Digital Interface (MIDI) data. In some embodiments, the music editing application can provide a graphical user interface (GUI) on an electronic device where the user can view musical data such as a sequence of note events in a MIDI file. The music editing application may also permit the user to perform various input with respect to the sequence of note events, e.g., via a touch-sensitive display of the electronic device. A note event is a representation of a musical note in musical performance data that can be associated with one or more note event characteristics, such as a pitch or duration. In some embodiments, the GUI for the music editing application (e.g., a matrix editor) can display a series of note events on a matrix grid. The matrix grid can be a first reference grid that is fixedly displayed on the matrix editor. At least a portion of the note events can be displayed on a second reference grid that is separate and overlaps the first reference grid. In some embodiments, the second grid is moveable with respect to the first grid where one or more note events placed on the second grid can maintain a spatial relationship with respect to each other. Further, the matrix editor permits the user to shift the note events grid (and the note events therein) to any location within the matrix grid, without being unintentionally snapped to a nearest grid location on the matrix grid.

Certain embodiments of the invention provide a music editing application that enables a user to create/remove a sequence of note events and modify characteristics of the note events. The music editing application (also referred to as a musical performance data editor or a matrix editor such as a MIDI matrix editor) can display the sequence of note events (also referred to as a MIDI event) that can be imported from a MIDI file. The music editing application can also display a set of tools usable by the user to create/remove note events and modify characteristics of the note events, e.g., via a touch-sensitive display of the electronic device.

MIDI can carry the note events (also referred to as event messages) that specify notation, pitch, and velocity. The note events can be used to trigger software instruments and external MIDI sound modules or keyboards. A note event can represent a musical note in musical performance data where the note event can be associated with one or more note event characteristics, such as a pitch or duration. Some embodiments can append additional tags (also referred to as MB3 data) to a MIDI file (i.e., standard MIDI data) to create an extended MIDI file to enable the additional characteristics to be associated with each note event. The additional tags provide additional information that enables the music editing application to generate a more realistic and nuanced performance.

Some embodiments enable extending the current MIDI standard by appending an additional byte to the standard MIDI event/packet. While a standard MIDI event can be made of 3 bytes, called the "MIDI Bytes." The MIDI Bytes can include a first byte (MIDI Byte 0 or MB0) including status and channel, a second byte (MIDI Byte 1 or MB1) including MB1 data, and a third byte (MIDI Byte 2 or MB2) including MB2 data. MB3 data is a fourth byte that can be appended to the MIDI Bytes to create an extended MIDI event or MIDI packet/data. The MB3 data or tag can provide additional detailed information to a MIDI event beyond the standard MIDI event. For example, the fourth byte can hold an "Articulation ID." In this example, the parameters of a note event can include MB1=pitch, MB2=velocity, and MB3=articulation.

As described, the addition of the $4^{th}$ byte can enable the storing of additionally assigned note event data such as an articulation and/or an instrument type since the original MIDI standard does not provide space for such information in data assigned to a note event. Some embodiments use additional control events (e.g., "General Purpose Controllers") to simulate the extension of the MIDI event. However, the additional control events can be easily and unintentionally separated from the note events for which they are intended, thereby making them difficult to handle. In some embodiments, the internal event structure (also referred to as internal event format) of the MIDI event allows the addition of an additional MB3 byte while maintaining the compatibility of the extended internal event. As such, the MB3 data can be appended to the individual MIDI events/packets.

In some instances, the MIDI event information can be sent out to an external MIDI device or packed into a MIDI file and read by standard MIDI system. In the instance that the system or program receiving the extended MIDI file cannot understand or handle the MB3 data (i.e., cannot read the additional byte), the MB3 information is stripped from the packet and is not transmitted to the external devices. In some embodiments, those systems or devices may simply ignore the additional MB3 value. The sampler or matrix editor in some embodiments may support the additional dimension of the MB3 data, thereby being capable of storing, reading, and managing values for different MB3 data.

By using the MB3 data, the music editing application can associate a note event with a set of note event characteristics (e.g., a type of instrument and/or an articulation) not typically associated with note events in standard MIDI files. Some embodiments provide the ability to encode additional performance characteristics (e.g., articulations) into the note event. For example, some embodiments can encode a note event with MB3 data type for an instrument (e.g., a guitar, a flute, a violin, etc.) or an articulation (e.g., pizzicato, legato, arco, strum, pick, bow, etc.). An articulation can define or include an effect on how a note is played. For example, notes on the violin and other bowed strings can be played long (legato) or short (staccato), or can be plucked rather than bowed (pizzicato), or trilled (moving quickly between two adjacent notes) or tremolo (quickly repeating the same note). Additional articulation marks can include the slur, phrase mark, staccato, staccatissimo, accent, sforzando, etc.

MIDI events include note events and other events specified in the standard MIDI specification. The MIDI note event can include MIDI note number (or pitch), velocity value, and note on/off data. Other MIDI events can include but not be limited to pitch bend, poly pressure, channel pressure, aftertouch and other controller events. One of ordinary skill in the art would recognize that controller events in a MIDI file can be used for setting or adjusting parameters for each of the MIDI channels. For example, controller events can be used for volume changes or expression pedals. In some embodiments, MB3 data/tag can apply to any MIDI event type associated with MIDI data such that one can use the MB3 data to add or facilitate additional functionality.

A controller event (also referred to as MIDI controller information or continuous data controller event) can include continuous data on modulation, sustain, volume, and pan, etc. In some embodiments, the controller event can be considered as being overlayed on top of the note events in an event session. The sliders and knobs on a keyboard can provide continuous data. By switching a knob representation expressions (e.g., parameters of the pedals, changing a volume of the system), the parameters of one or more note events may change (e.g., be filtered or volume enveloped). In some embodiments, the controller information is not related to the individual note event, but applies to all note events in an event session. For example, by modifying the sustain pedal, all the note events and not just individual notes may be affected and can receive the effect corresponding to the sustain pedal event.

In certain embodiments of the invention, the matrix editor can display a sequence of note events on a matrix grid. The matrix grid enables a user to identify the note length or duration of a note event as indicated by the start an end positions of a note event, aligned with time values shown in a bar ruler. In some embodiments, the note events can be displayed on a note events grid that can overlap the matrix grid. The matrix editor in some embodiments enables the user to shift the note events grid with respect to the matrix grid. As such, the note events on the note events grid can be shifted against the matrix grid in time and/or in pitch, while allowing the note events to maintain their spatial relationship with respect to each other. In some embodiments, the note events grid can be shifted against the matrix grid without being subject to quantization. "Quantization" can be referred to as the rhythmic correction of audio or MIDI to a specific time grid. In some embodiments, the matrix editor can allow the user to shift the note events grid to any location within the matrix grid, without being unintentionally snapped to a nearest position or grid location on the matrix grid (or a quantized grid).

FIG. 1 illustrates an example of a music editing system 100 of some embodiments that enable a user to compose and edit musical performance data using a music editing application. Audio editing system 100 can include multiple subsystems such as a display 105, one or more processing units 110, and a storage subsystem 115. One or more communication paths can be provided to enable one or more of the subsystems to communicate with and exchange data with one another. The various subsystems in FIG. 1 can be implemented in software, in hardware, or combinations thereof. In some embodiments, the software can be stored on a transitory or non-transitory computer readable storage medium and can be executed by one or more processing units.

It should be appreciated that audio editing system 100 as shown in FIG. 1 can include more or fewer components than those shown in FIG. 1, can combine two or more components, or can have a different configuration or arrangement of components. In some embodiments, audio editing system 100 can be a part of a portable computing device, such as a tablet computer, a mobile telephone, a smart phone, a desktop computer, a laptop computer, a kiosk, etc.

Display 105 in some embodiments can provide an interface that allows a user to interact with audio editing system 100. Display 105 can be a monitor or a screen in some embodiments. Through the interface, the user can view and interact with a GUI 120 of a music editing application. In some embodiments, display 105 can include a touch-sensitive interface (also sometimes referred to as a touch screen) that can both display information to the user and receive inputs from the user. Processing unit(s) 110 can include one or more processors that each have one or more cores. In some embodiments, processing unit(s) 110 can execute instructions stored in storage subsystem 115.

Storage subsystem 115 can include various memory units such as a system memory, a read-only memory (ROM), and a permanent storage device. The system memory can be a read-and-write memory device or a volatile read-and-write memory, such as dynamic random access memory. The system memory can store some or all of the instructions and data that the processor needs at runtime. The ROM can store static data and instructions that are needed by processing unit(s) 110 and other modules of audio editing system 100. The permanent storage device can be a read-and-write memory device. Some embodiments of the invention can use a mass-storage device (such as a magnetic or optical disk or flash memory) as a permanent storage device. Other embodiments can use a removable storage device (e.g., a floppy disk, a flash drive) as a permanent storage device.

Storage subsystem 115 can store editor code 125 for running a music editing application on system 100, MIDI data 130 for storing data relating to a limited set of parameters for note events, and MB3 data 135 for storing additional information about each note event 135. In some embodiments, the additional information can include various indicators associated with each note event, such as an instrument or an articulation that can be associated with each note event, along with other information for each note event.

FIG. 2 illustrates an example process 200 of some embodiments for enabling a user to edit a characteristic of a note event in a music editing application. Process 200 can be implemented, for example, in system 100 of FIG. 1 executing editor code 125 to run the music editing application in some embodiments. Some or all of the process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program to be executed by processing unit(s), such as a browser application. The computer-readable storage medium may be non-transitory.

At block 202, the music editing application (also referred to as matrix editor) can provide a user interface that displays at least one track or recording (e.g., in a MIDI channel) including one or more note events. At block 204, the music editing application can receive a user selection of a particular note event in the one or more note events. The selection can be performed by the user tapping in a vicinity of the particular note event on a touch-sensitive display (e.g., display 105 in FIG. 1) to indicate a selection of the particular note event. Different embodiments can allow the selection to be performed differently. For example, some embodiments allow the user to select the particular note event upon a cursor operation. In some embodiments, multiple note events can be selected at the same time.

At block 206, in response to the user selection of a particular note event, the user interface can display a set of user-selectable user interface items for associating the particular note event with one or more note event characteristics. The set of user-selectable user interface items can represent a set of note event characteristics such as different pitch, varying duration, different instruments, different articulations, etc. that can be associated with the particular note event. Different embodiments can display the set of user-selectable user interface items differently, such as in a list or pull-down menu.

In some embodiments, instead of displaying all the various characteristics with which a note event can be associated on the user interface in a list, the user interface can display the characteristics in a nested hierarchical format. For example, the user interface can display a set of user-selectable user interface items representing different categories of characteristics for a note event, such as a pitch category, instruments category, articulations category, etc. The user may then choose the particular category that includes the note event characteristics that the user would like to modify or set for the particular note event.

In response to a selection of one of the categories of characteristics, the user interface can display the characteristics that fall within the category of characteristics. For instance, if the user has selected the instruments category as the category of characteristics, user interface can display different types of instruments including piano, violin, viola, cello, bass, guitar, drums, etc. In another instance, if the user has selected the articulations category, the user interface can display different types of articulations including a legato articulation, a tenuto articulation, a slur articulation, a staccatissimo articulation, a portato articulation, an ornamental articulation (e.g., trills, mordent, or grace notes), a marcato articulation, a fermata articulation, a pizzicato articulation, a staccato articulation, etc. These different types of instruments and/or articulations can be displayed in a drop-down list, a menu, etc.

Different instruments may have a different set of articulations associated with them. For example, a violin (or other string instruments) can have bow articulations including pizzicato, legato, arco, staccato, tremolo, trills, etc. while a brass instrument can have different articulations associated with it. Some types of articulations are unavailable to certain instruments. For example, pizzicato may be available to string instruments such as violins, cellos, etc., but not pianos. Articulations available to a piano can include staccato and legato, etc. Articulations available to percussion instruments (e.g., drum, the timpani, etc.) can include a single hit, tremolo, etc. Further, articulations available to woodwind instruments (e.g., flute, oboe, clarinet) can include legato and staccato, etc. Articulations available to brass instruments (e.g., the French horn, the trumpet) can include legato, staccato, crescendo, etc.

At block 208, the music editing application can receive a user input indicating a selection of a note characteristic for the particular note event. The user input can be performed upon a user tapping on the portion of the touch-sensitive display screen displaying a UI item that represents the note characteristic. In some embodiments, the note characteristic can indicate when a note event starts, when a note event ends, the velocity or loudness of the note event, the pitch of the note, etc. Further, the note characteristic can be a type of instrument, an articulation type, etc. The note characteristics including an instrument characteristic or an articulation characteristic can be encoded to a note event using the MB3 data, as mentioned.

At block 210, the music editing application can associate the particular note event with the selected characteristic based on the user input. Upon receiving the user selection of at least one characteristic, the music editing application can associate the particular note event with the characteristic. In some embodiments, the music editing application can receive another selection of another note characteristic (e.g., another type of instrument or articulation) for the particular note event and associate the other note characteristics with the particular note event. The music editing application allows the user to change the note event characteristics of various note events in the sequence of note events as the user desires.

Different note events in the same sequence may be associated with different instruments and/or different articulations (in addition to other note event characteristics) as well. In some embodiments, audio editing application enables the user to modify/edit a note event characteristic of multiple note events at the same time.

As described above, some embodiments allow a user to edit a characteristic of a note event and associate the note event with different instruments. FIGS. 3A-3E illustrates an example sequence of screen images (using GUI 300, similar to GUI 120 in FIG. 1) for editing a characteristic of a note event in a music editing application in accordance with some embodiments. In FIG. 3A, the music editing application or the matrix editor 330 displays a GUI 300 that includes a number of display areas: a matrix grid 335, a vertical keyboard 340, a tool box 345, and an information display 350. In some embodiments, matrix editor 330 can include additional or fewer display areas displaying additional or fewer components of matrix editor 330. The multiple display areas can be rearranged and thereby displayed in a different arrangement than that shown in FIG. 3A.

Matrix grid 335 can display note events of a portion of a musical performance piece or sound track (e.g., one or more MIDI regions) or the entire track (e.g., all MIDI regions in a folder or project). In this example, matrix grid 335 displays a sequence of note events (e.g., note events 355) in a particular region (e.g., a MIDI region) of a track or musical piece (e.g., imported from an external source or created by the user). Note events 355 in this example are represented by a series of horizontal rectangles or blocks aligned on matrix grid 335 including horizontal and vertical lines (representing time parameters and musical pitch parameters, respectively). The horizontal placement of note events indicates their temporal (e.g., bar, beat, and sub-beat) positioning within the region, and project. The length of the rectangle in matrix grid 335 is directly proportional to the note length. The vertical position of note events indicates their respective pitch, with those nearer the top of the matrix grid 335 being higher in pitch. Chords are displayed as a vertical stack of note rectangles.

In this example, matrix editor 330 also includes a vertical keyboard 340 on the left side of matrix grid 335 that indicates note pitches. As shown, horizontal black lines run across matrix grid 335 to enable the user to easily transpose notes by dragging them up or down. Although a piano-type matrix editor is shown in this example, a user can select a different type of matrix editor for different types of instruments, such as a string-type or guitar-type matrix editor. In such embodiments, instead of vertical keyboard 340, the matrix editor can display a vertical guitar/string fretboard, a string neck, or a guitar neck in a user interface.

Matrix editor 330 also includes tool box 345 that provides various tools that a user of matrix editor 330 can use to facilitate the editing process, such as a compose/edit toggle button 360, an undo button 362, a previous track button 364, a play button 366, a record button 368, etc. Compose/edit toggle button 360 allows the user to activate an add-new-notes/delete-existing-notes mode (also referred to as a shortcut mode or a quick-edit mode) or an edit-existing-notes mode. In some embodiments, the user can activate the add-new-notes/delete-existing-notes mode by toggling button 360 to the right and an edit-existing-notes mode by toggling button 360 to the left. Upon activating the add-new-notes/delete-existing-notes mode, the user can select different areas within matrix grid 335 (e.g., by touching those areas within matrix grid 335 using a finger) to add new note events.

In some embodiments, the user can edit different existing notes events within matrix grid 335 when the edit-existing-notes mode is activated. In such embodiments, compose/edit toggle button 360 can be toggled to the right to indicate that matrix editor 330 is in edit-existing-notes mode. Matrix editor 330 also includes an information display area 350 that can indicate a set of characteristics of a selected note event such as a current position, a pitch, an associated instrument, and an associated articulation of the selected note event in the region, when the user has selected one. Information display area 350 can display information about a note event in real-time upon selection of the note event such that the user can quickly and easily identify the specifications of each note event as the user selects different note events.

As shown in this example, compose/edit toggle button 360 is toggled leftward, indicating that the edit-existing-notes mode is currently activated. By activating the edit-existing-notes mode, the user can modify characteristics of a note event (e.g., a location, a pitch, etc.) upon identifying the note event and edit a set of parameters associated with the note event. FIG. 3A shows a user selecting a particular note event 375 in matrix grid 335. In this example, a selection is made by placing a finger in the vicinity of note event 375. As shown, this selection is displayed in terms of a thick border for the window that contains note event 375. Different embodiments can indicate such a selection in different ways, such as by highlighting the note event, by causing the note event to vibrate, etc.

Upon selection of note event 375, information display area 350 displays the current position, pitch, instrument, and articulation for note event 375, as shown in this example. Different embodiments can cause information display area 350 to display additional or fewer parameter values than those shown in this example. In some embodiments, the user can move selected note 375 by dragging selected note 375 to a different location within matrix grid 335. As described, a pitch of note 375 can be modified by moving note 375 vertically across the matrix grid and a time position of note 375 within a musical piece can be modified by moving note 375 horizontally across the matrix grid.

Figure 3B:
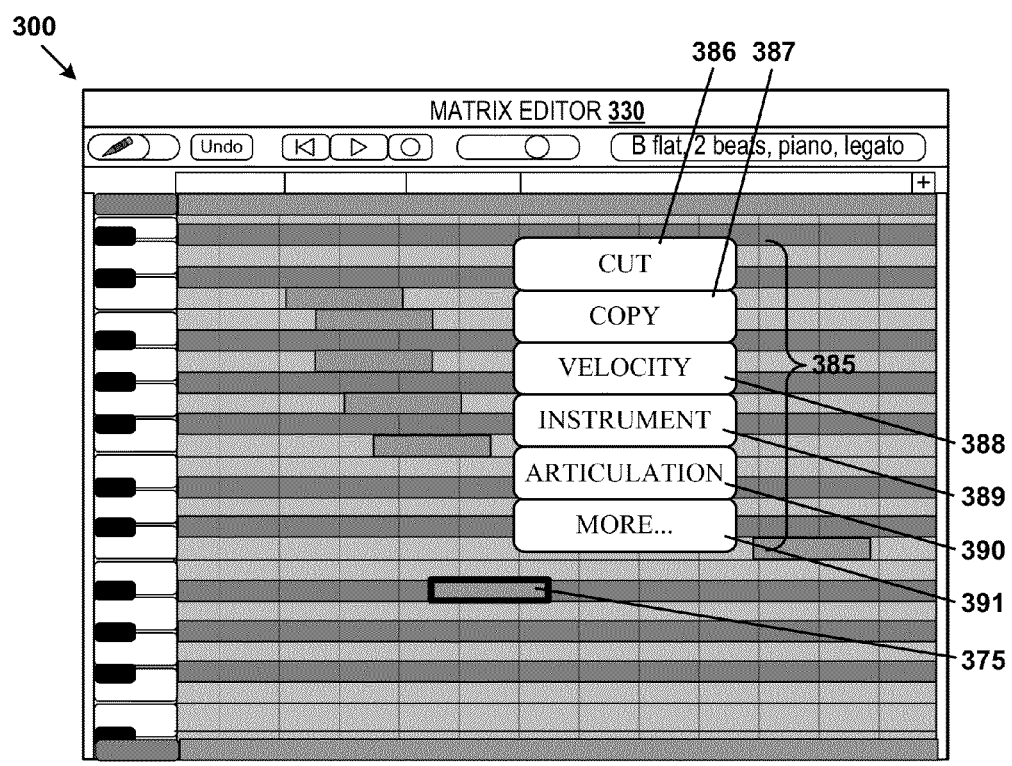

In FIG. 3B, GUI 300 displays an edit-note selection menu 385 that allows the user to select various user-selectable items representing different operations that can be performed on note 375 (or notes) selected in FIG. 3A, in response to receiving a user indication to activate the display of menu 385. In some embodiments, the user indication can be a further selection of note event 375 (e.g., through a right-click or double tap in the vicinity of selected note event 375). Different embodiments can allow the user to activate the display of menu 385 differently, such as upon a motion gesture. Further, in some embodiments, menu 385 can be displayed upon user selection of note event 375 in FIG. 3A without requiring further user indication.

Edit-note selection menu 385 displays a set of selectable items including a cut button 386, a copy button 387, a velocity button 388, an instrument button 389, and an articulation button 390, and a more button 391. Cut button 386 can be selected when the user wants to move a note event to a different location. Copy button 387 can be selected when the user wants to place a note event with similar characteristics in another location. Velocity button 388 can be selected when the user wants to modify a velocity associated with a note event. Instrument button 389 can be selected when the user wants to set or modify an instrument associated with a note event. Articulation button 390 can be selected when the user wants to set or modify an articulation characteristic associated with a note event. More button 391 can be selected when the characteristic that the user desires to set or modify is not displayed within the menu currently displayed e.g., due to the limitations of the display screen. Although not shown in this example, edit-note selection menu 385 in some embodiments can include a number of different and/or additional or fewer buttons representing different functions.

Figure 3C:
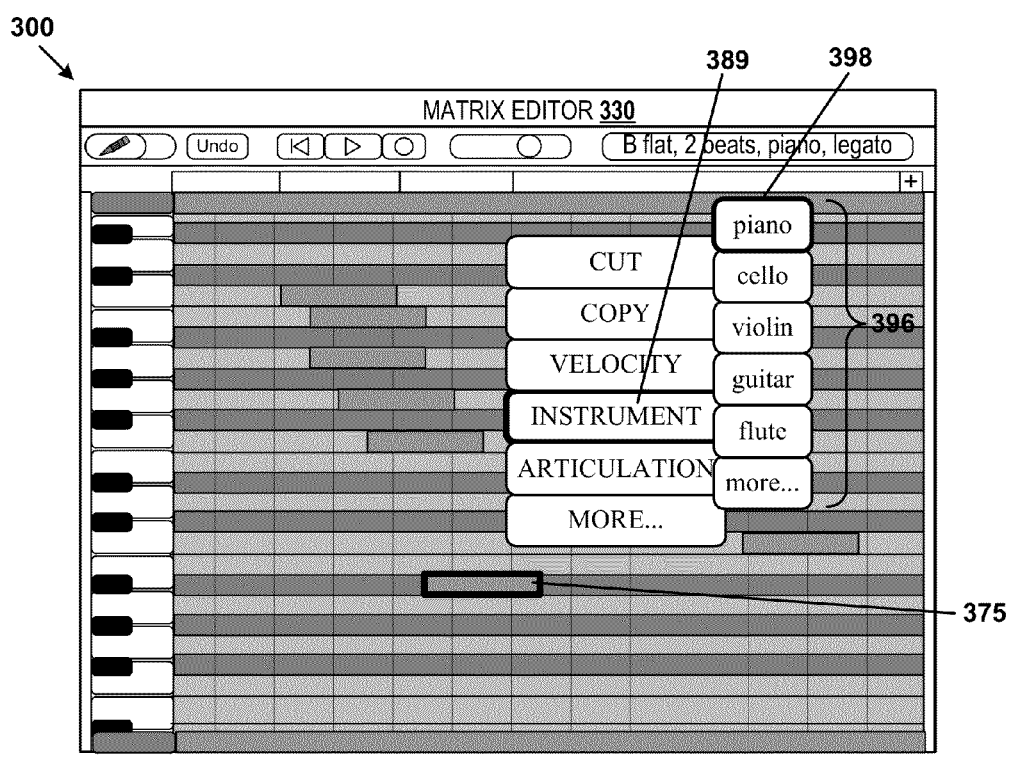

FIG. 3C shows the user selecting instrument button 389 (e.g., through a finger tap). In this example, instrument button 389 is highlighted to indicate that the user would like to edit the instrument associated with note event 375. Different embodiments can indicate such a selection in different ways.

Further, in response to receiving a user selection of instrument button 389, a selectable menu 396 including a number of different instruments is displayed. As shown in this example, selectable menu 396 displays a set of selectable items including a piano, a cello, a violin, a guitar, and a flute. Different embodiments can display a set of selectable items that include fewer or more options compared to this set, including additional or fewer instrument types.

In this instance, since note event 375 is currently associated with a piano instrument, piano item 398 is highlighted to indicate that note event 375 is currently associated with a piano. Different embodiments can indicate that note event 375 is associated with different characteristics differently, such as by displaying a checkmark next to a selectable item representing the associated instrument. In some instances, note events may not be currently associated with any instrument. In such instances, in response to receiving user selection of instrument button 389, none of the items representing different instruments would be highlighted in selectable menu 396.

Figure 3D:
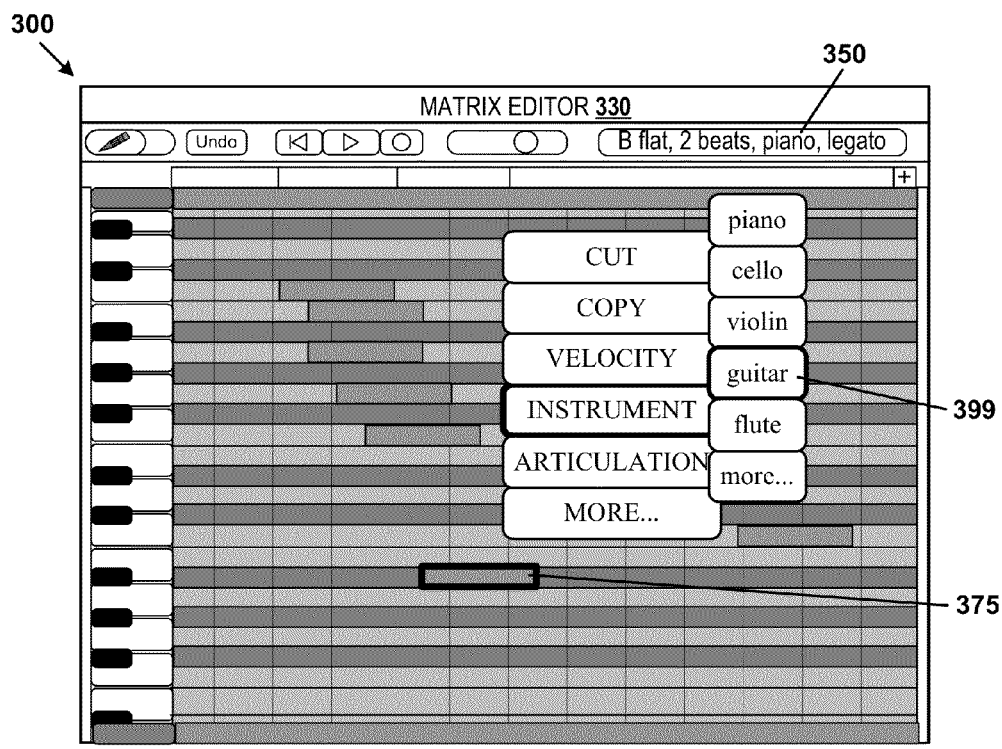
Figure 3E:
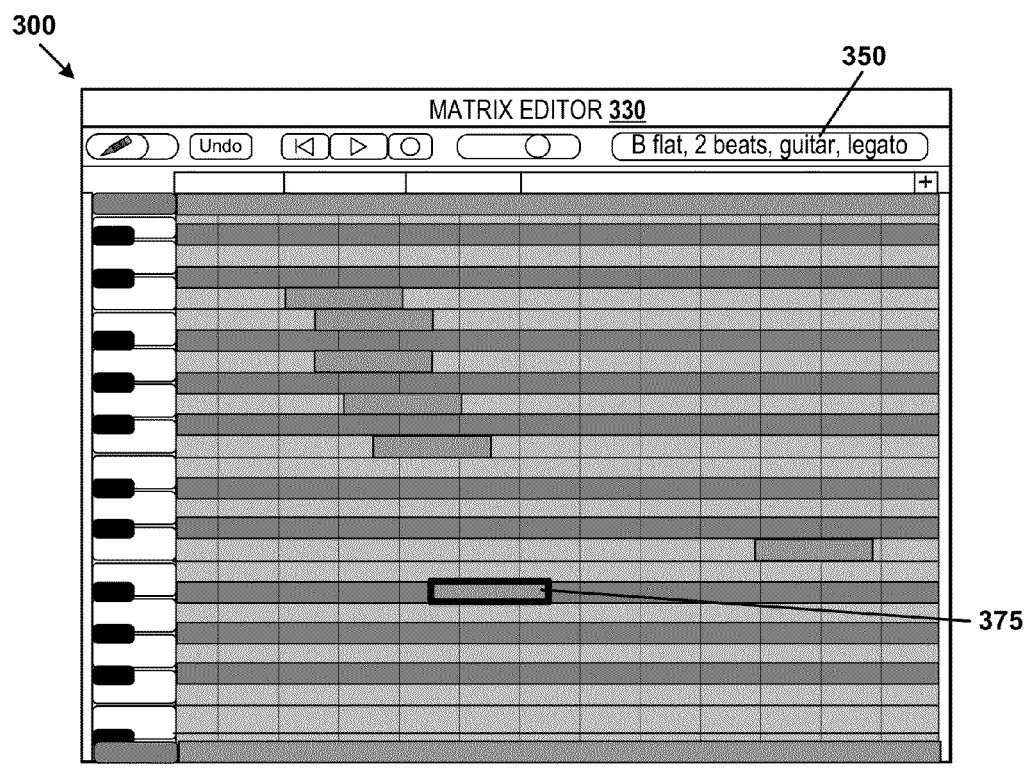

FIG. 3D indicates that guitar item 399 has been selected (e.g., via a finger tap), as shown by the thick border surrounding guitar item 399. Note event 375 is now associated with a new instrument (i.e., guitar). As shown in FIG. 3E, information display area 350 now indicates the note event 375 is associated with a guitar rather than a piano. The user can continue to edit parameters associated with note events by performing a similar sequence of operations. As shown by this example, note events that were previously associated with one type of instrument can be modified to be associated with another type of instrument. Instead of modifying note event characteristics of each note event one-by-one, some embodiments enable the user to modify the note event characteristic of multiple notes at the same time by selecting multiple note events and performing similar operations as those shown in FIGS. 3A-3E.

While some embodiments enable the user to associate a note event with a different instrument, some embodiments also enable the user to associate a note event with a different articulation. FIGS. 4A-4E illustrates an example sequence of screen that can be displayed on GUI 400 (similar to GUI 120 in FIG. 1) of a music editing application for editing a note event to associate the note event with a different articulation.

Figure 4A:
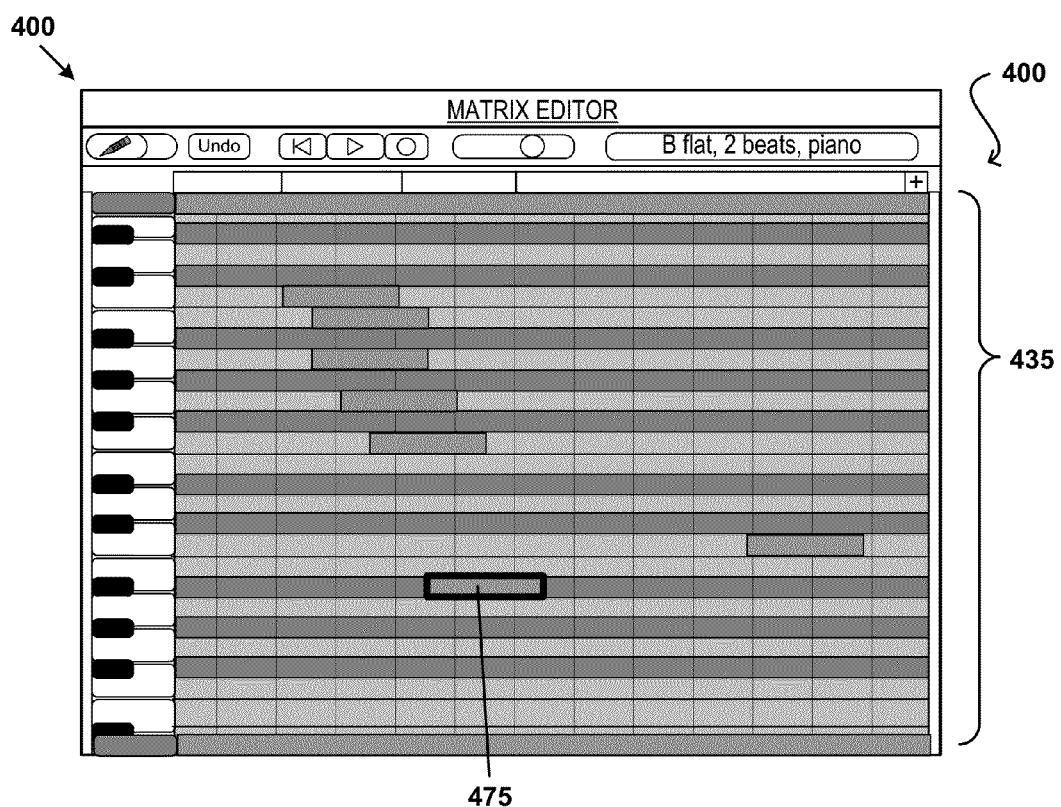
FIGS. 4A-4E shows another example sequence of screen images for editing a characteristic of a note event in a music editing application in accordance with some embodiments.
Figure 4B:
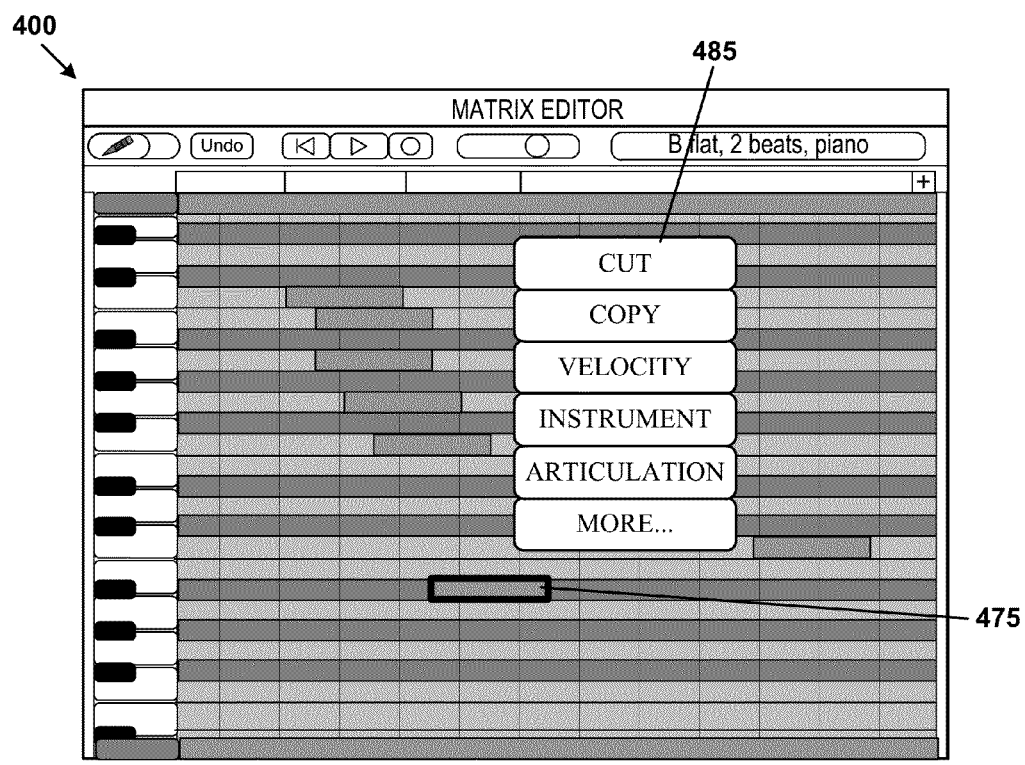

FIGS. 4A-4B are the same as the first two stages as illustrated in FIGS. 3A-3B. FIG. 4A shows a selection of a particular note event 475 in matrix grid 435 (similar to matrix grid 335 in FIG. 3A). FIG. 4B illustrates that upon receiving a user indication (e.g., a double-tap within the vicinity of note event 475), GUI 400 displays a pop-up menu 485 (similar to menu 385 in FIG. 3B) including various user-selectable items representing different categories of characteristics.

Figure 4C:
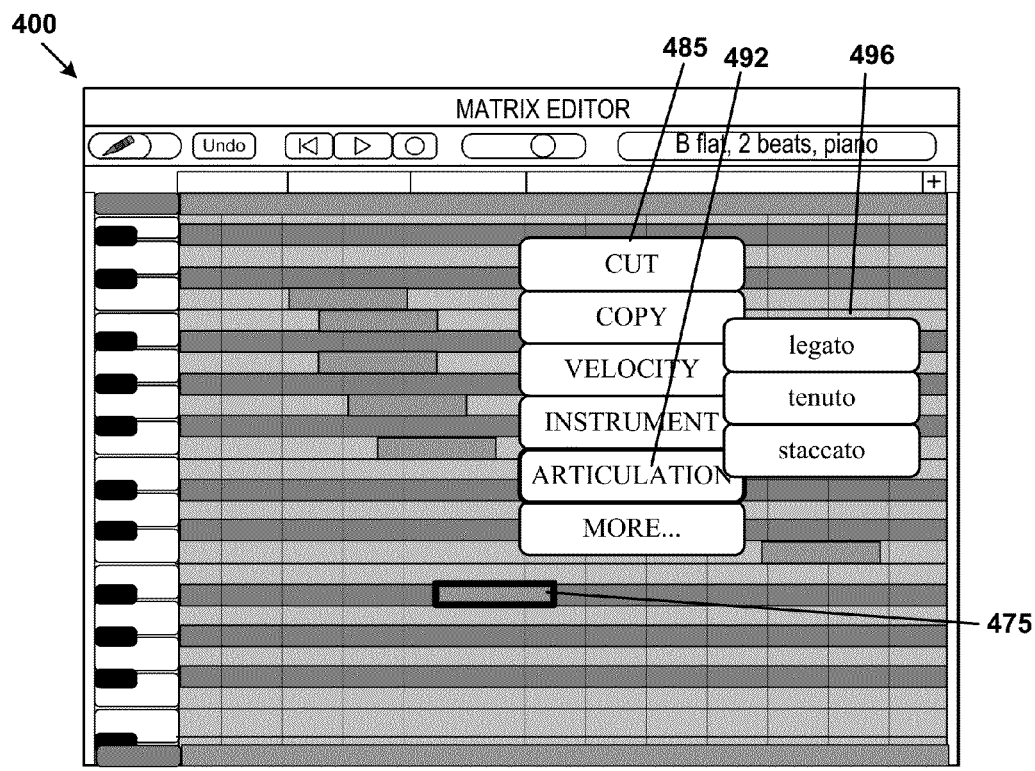

FIG. 4C shows a selection of articulation button 492 (e.g., through a finger tap) in menu 485. In this example, articulation button 492 representing an articulation category is highlighted to indicate user selection of the articulation category for editing. As described, different embodiments can indicate such a selection in different ways. In response to the user selection of articulation button 392, a sublist or a selectable menu 496 including different types of articulation types under the articulation category can be displayed. As shown, selectable menu 496 displays a set of selectable items including a legato articulation, a pizzicato articulation, and a staccato articulation. Additional or fewer articulation types can be shown in different embodiments. Since note event 4375 is not currently associated with any type of articulation, none of the items in selectable menu 496 are highlighted. In some embodiments, note event 475 can already be associated with a particular type of articulation (e.g., through prior configuration), which its representative item would then be displayed as being highlighted in this stage.

Figure 4D:
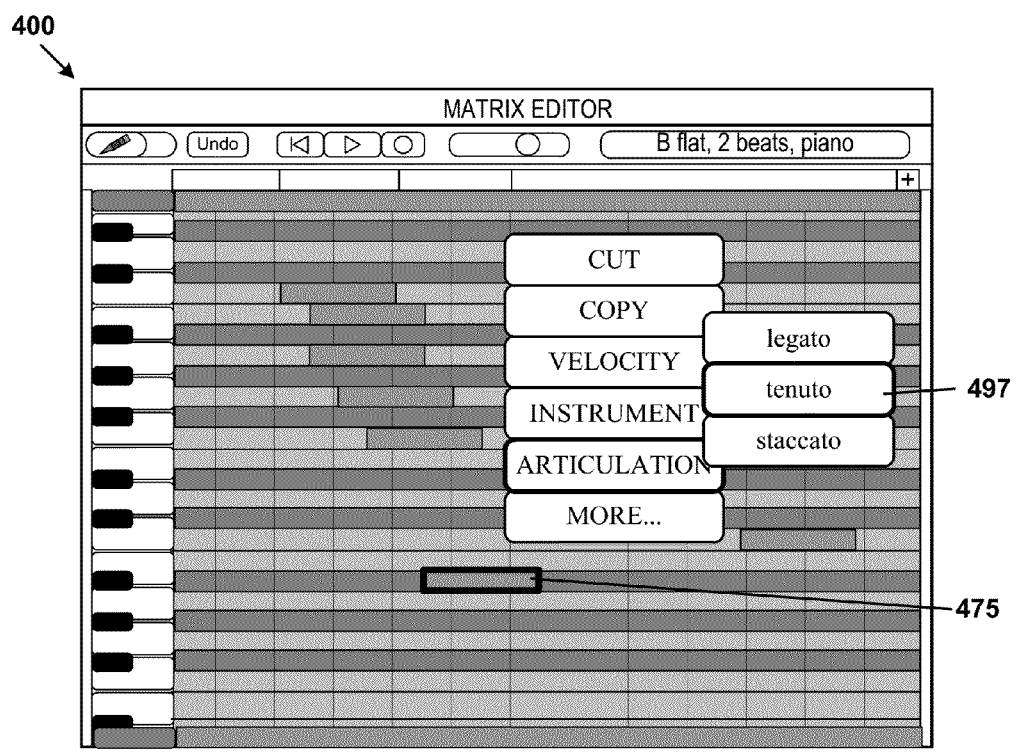
Figure 4E:
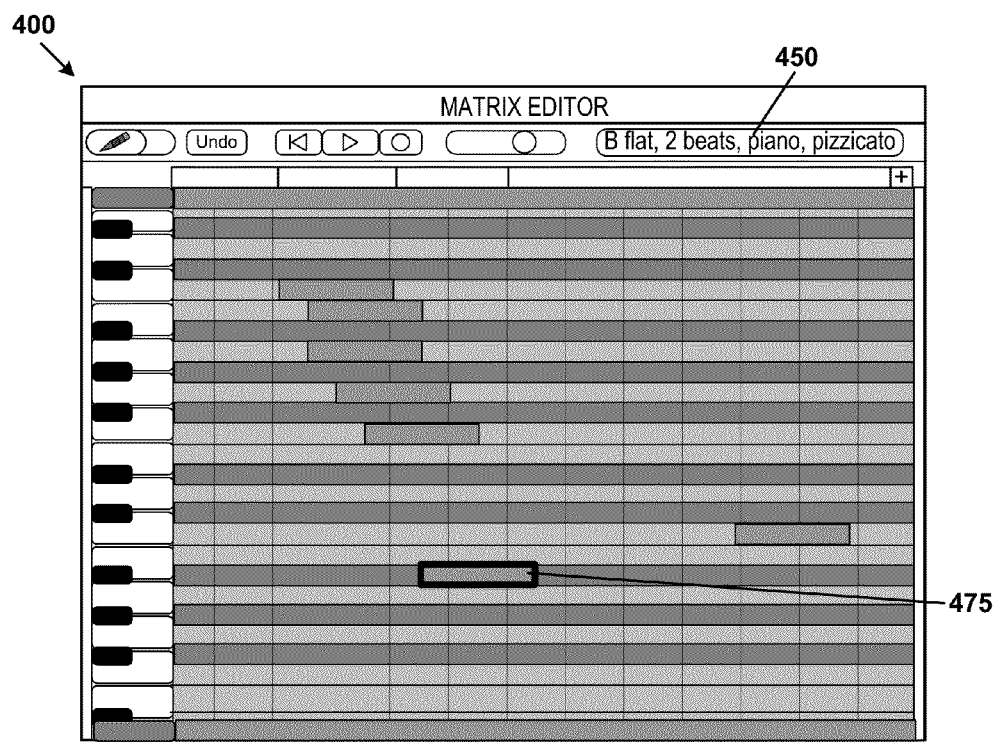

FIG. 4D shows a selection of a pizzicato selectable item 497 (e.g., through a finger tap). Pizzicato selectable item 497 is highlighted to indicate that the user has selected to associate the particular note event with a pizzicato articulation. As shown in FIG. 4E, information display area 450 now indicates that note event 475 is associated with a pizzicato articulation.

Although in FIGS. 3A-3E and 4A-4E, only one particular note event is selected for edit, some embodiments allow the user to select multiple note events to edit simultaneously. In instances where multiple note events are being edited at the same time, information display areas 350 and 450 can either not display any information or it can display the information for each of the selected note events. In such embodiments, upon receiving user selection of a note event characteristic, music editing application can associate the selected note events to the selected characteristic at the same time.

Further, while in FIGS. 3A-3E (and in 4A-4E), compose/edit toggle button 360 is toggled to the left to indicate that matrix editor 330 is in edit-existing notes mode, matrix editor 330 can operate in add-new-notes/delete-existing-notes mode when compose/edit toggle button 360 is toggled to the right. As described, new note events can be added to various locations within matrix grid 335 and existing notes can be deleted from various locations within matrix grid 335 upon user indication (e.g., tapping a background or an existing note) when matrix editor 330 is in the add-new-notes/delete-existing-notes mode or quick-edit mode.

The user can add new note events in matrix grid 335 when the user drags compose/edit toggle button 360 to the right and temporarily holds compose/edit toggle button 360. As the user holds compose/edit toggle button 360, matrix editor 330 can allow the user to add new notes upon user indication of the locations to add the new notes (e.g., by tapping locations in the matrix grid with a finger). Matrix editor 330 can allow the user to delete existing notes upon user indication of the notes to delete (e.g., by tapping existing notes). Different embodiments can allow the edit-existing notes mode and the add-new-notes/delete-existing-notes mode to be activated and deactivated in different ways, such as upon a user selection of a selectable item representing one of the modes. In some embodiments, the added notes may be subject to quantization and snap to an active musical time grid (e.g., to the pitch where the user tapped).

While matrix editor 330 is in the quick-edit mode, matrix editor 330 enables the user to identify a location to which the user might want to add the note event by pressing down on a location in the matrix grid and dragging the finger across the screen to indicate an exact position or location for the note (e.g., in the x- and y-axes or also referred to as the pitch and time position). The location to place the added note event in the matrix grid may be identified as the location where the user stops dragging the finger and lifts the finger from the screen. In some embodiments, the note event may snap to a closest grid location or may remain in exactly the location in the matrix grid corresponding to where the finger left the screen.

In some embodiments, matrix editor 330 can allow a user to add new notes or delete existing notes even when matrix editor 330 is in an edit-existing-notes mode. For example, matrix editor 330 can provide a tool (e.g., a context menu command including cut/copy commands) whereupon selection or activation of the tool, the user may add or delete selected note events. Different embodiments can enable the user to add new notes or delete existing notes even when matrix editor 330 is in an edit-existing-notes mode differently. For example, a user can overwrite the current mode by using various gesture indications, by selecting another selectable item that can temporarily overwrite the mode, etc.

Further, matrix editor 330 can also allow the user to edit existing notes even when matrix editor 330 is in an add-new-notes/delete-existing-notes mode. For instance, the user can edit existing note events in matrix grid 335 when the user drags compose/edit toggle button 360 to the left (or right in some instances) and temporarily holds compose/edit toggle button 360. As the user holds compose/edit toggle button 360, matrix editor 330 can allow the user to edit existing notes as the user selects individual or multiple note events for editing. Similarly, different embodiments can enable the user to edit existing notes even when matrix editor 330 is in an add-new-notes/delete-existing-notes mode differently.

In addition to enabling an association of note event characteristics including an instrument and/or an articulation with one or more note events, a matrix editor can enable the user to modify other characteristics of the note events, such as a location of the note events within a musical piece. FIG. 5 illustrates an example process 500 of some embodiments for enabling a user to shift a segment of note events to a different location in a MIDI file using a music editing application. The matrix editor can include a matrix grid that is capable of displaying at least a portion of the MIDI file, or in this case the segment of note events. In some embodiments, the segment of note events can be placed on a note event grid and shifted to any location within the matrix grid without being unintentionally aligned or snapped to a grid line in the matrix grid (i.e., without being "quantized"). Process 500 can be implemented, for example, in system 100 of FIG. 1 executing editor code 125 to run music editing application in some embodiments.

In some embodiments, music editing application can cause a segment of note events to be placed on a grid separate from the matrix grid. Music editing application can enable the grid including the note events (also referred to as the note events grid) to shift in different directions (e.g., up, down, left, right, diagonally) with respect to the matrix grid. For example, a user of music editing application can shift the note events grid up/down (or along the pitch axis) with respect to the matrix grid in order to shift the note events to a higher/lower pitch while the note events maintain their spatial relationship. As such, the pitch variation and the beat between each note event in the segment can be maintained, although the note events may have a uniformly shifted pitch. In another example, the user can shift the note events grid to the left/right (or along the temporal axis) with respect to the matrix grid in order to shift the note events temporally in the music piece.

At block 502, a music editing application can provide a user interface that displays at least a portion of a track including note events. For example, GUI 120 in FIG. 1 can display a set of note events on a matrix grid where the set of note events is at least a portion of a musical piece. At block 504, the music editing application can receive a user selection of a subset of the set of note events displayed on the user interface and place the subset on a note events grid. The note events grid can overlap the matrix grid and can move with respect to the matrix grid. In some embodiments, the matrix grid can be provided on a first reference grid, while the selected subset of the note events can be provided on a second reference grid. In some embodiments, all the note events on the matrix grid can be placed on a separate reference grid from the first reference grid.

At block 506, the music editing application can receive a user indication to shift the note events grid including the subset of the note events with respect to the matrix grid. In some embodiments, the user indication can be a finger dragging movement (e.g., a drag-and-release movement) that directs the second reference grid (including the selected subset of note events) towards a particular direction with respect to the first reference grid. For instance, when the user drags the finger towards the left, the second reference grid can move in a leftward direction over the first reference grid. Different embodiments can allow the user indication to be performed differently, such as through a cursor controller movement. In some embodiments, the user indication can direct the selected subset of note events in the second reference grid in any direction (e.g., up, down, diagonally, right) with respect to the first reference grid while maintaining a distance or spatial relationship between the different note events within the subset.

At block 508, music editing application can shift the subset of the note events with respect to the matrix grid while the note events maintain their spatial relationship with respect to each other. In some embodiments, in response to the user indication to shift the subset of the note events with respect to the matrix grid, matrix editor can shift the subset of the note events into a particular location within the matrix grid. For instance, when the user drags the fingers towards the left and stops in an earlier location within the matrix grid, the, the subset of note events can be shifted to an earlier portion within the musical piece. As such, the subset of note events can appear in a different location within the matrix grid without disrupting the spatial relationship between the notes in the subset. At block 510, music editing application can display the portion of the matrix including the shifted subset of the note events.

While the user is editing a piece of musical performance, the user may want to shift a segment of note events to a different location within a matrix for a variety of reasons, such as when the user determines that a different location within the musical piece is more appropriate for the segment of note events. Some embodiments of the invention allow a user to shift a spatial relationship of a set of note events with respect to a matrix. FIG. 6 illustrates such an example that can be performed using the music editing application.

In some embodiments, the music editing application can enable the matrix to be placed on a first grid and musical note events on a second grid that overlaps the first grid. As such, the user of the music editing application can move the musical note events on the second grid to any location within the first grid by shifting the second grid with respect to the first grid. FIGS. 6A-6D illustrates an example sequence of screen images (using GUI 600, similar to GUI 120 in FIG. 1) for shifting note events on a note events grid with respect to a matrix grid displayed on a display device (e.g., display 105 in FIG. 1) in accordance with some embodiments.

Figure 6A:
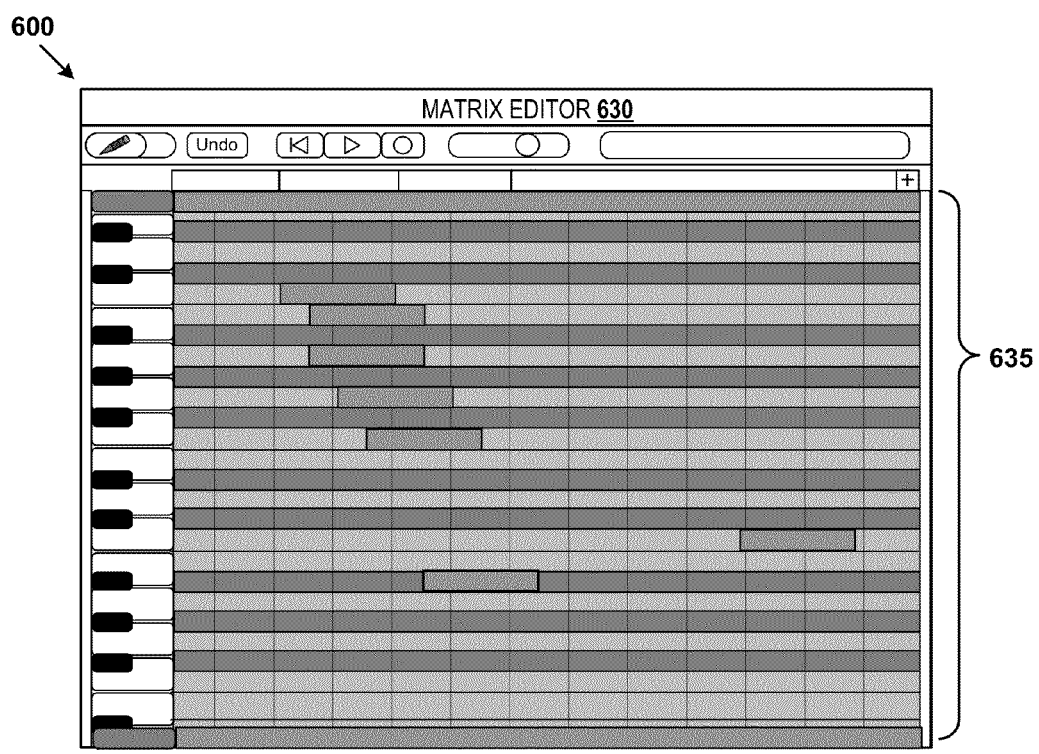
FIGS. 6A-6D illustrates an example sequence of screen images for shifting note events on a note events grid with respect to a matrix grid in accordance with some embodiments.

As shown in FIG. 6A, GUI 600 displays a matrix editor (e.g., matrix editor 630 similar to matrix editor 330 in FIG. 3) of the music editing application. Similar to that shown in FIG. 3A, matrix editor 630 can display a matrix grid 635 (similar to matrix grid 335 in FIG. 3A) including a set of note events. In some instances, matrix editor 630 displays only a portion of the matrix grid including a subset of the note events in a track, such as when the user is zoomed into the portion of the matrix grid or when not all the note events can fit on the screen. In some embodiments, the matrix grid is placed on a first reference grid while the set of note events is placed on a separate reference grid.

Figure 6B:
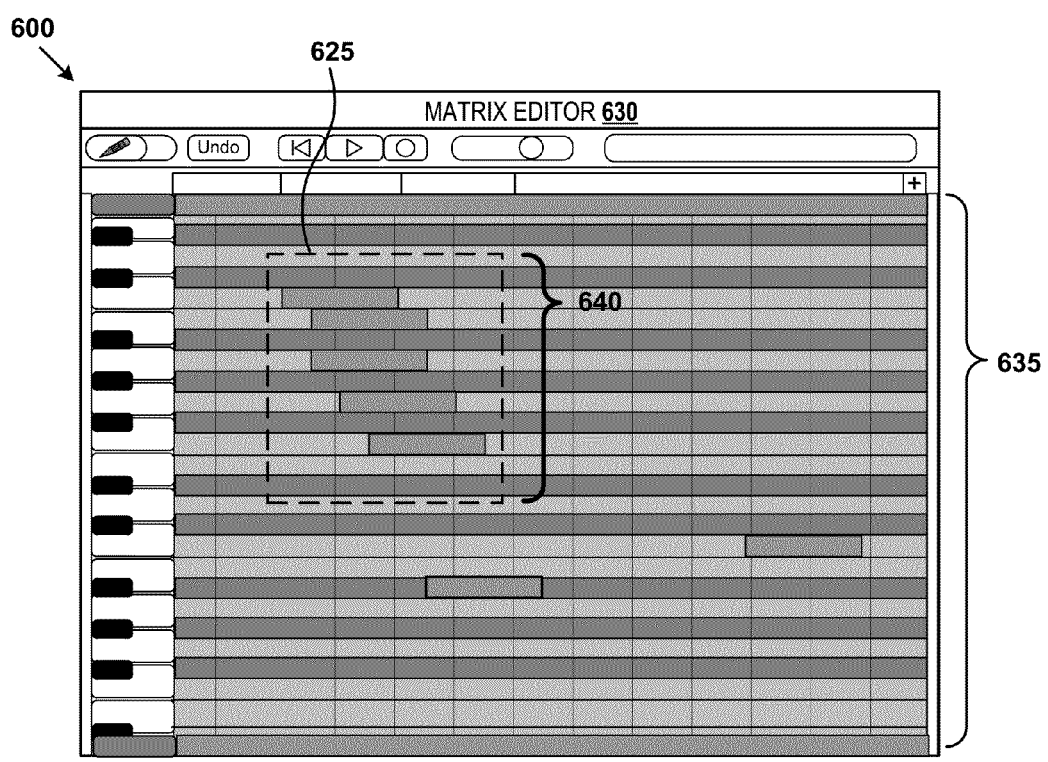

FIG. 6B illustrates the user initiating the grid-edit operation by selecting a portion 625 within the matrix editor including a subset of note events. In some embodiments, the user can select a portion within the matrix editor by double tapping a location within the matrix grid (e.g., using a finger) and dragging the finger to another location within the matrix grid such that a subset of note events can be selected. Different embodiments can enable the user to select the subset of note events differently. In some embodiments, the selected subset of note events is placed on a second reference grid 640 different from the first reference grid 635.

Figure 6C:
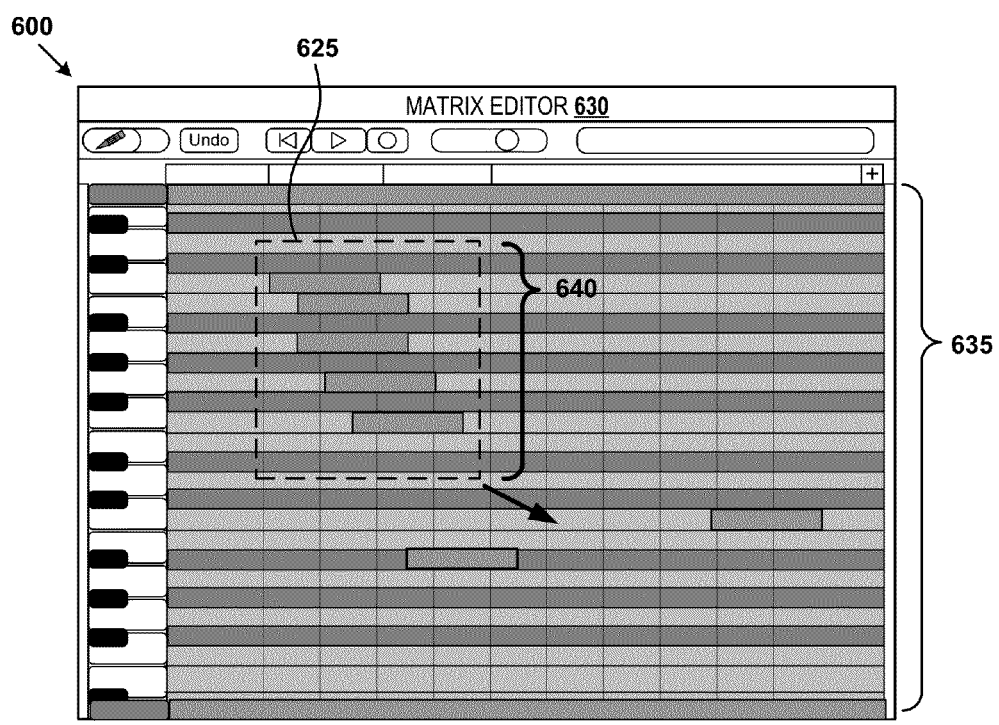

FIG. 6C illustrates that upon selecting the subset of note events 625 that are placed on a second reference grid 640, user can shift the second reference grid 640 with respect to the first reference grid 635 by directing the second reference grid 640 toward a particular direction (e.g., the direction indicated by the arrow). In some embodiments, user can direct the selected subset of note events on the second grid toward a lower right corner by dragging the finger in that direction. While a computing device in some embodiments includes a touch-sensitive display that enables the user to interact with and shift the set of note events using the touch-sensitive display, different embodiments enable the user to direct the second grid towards a particular direction in different ways, such as by via a cursor controller. Further, in some embodiments, the first reference grid (or the matrix grid) can include guide markers such as a beat marker, a musical bar marker, an event indicator, and a note length marker. The guide markers in some embodiments can help the user determine the location to which the user would like to shift the second reference grid.

Figure 6D:
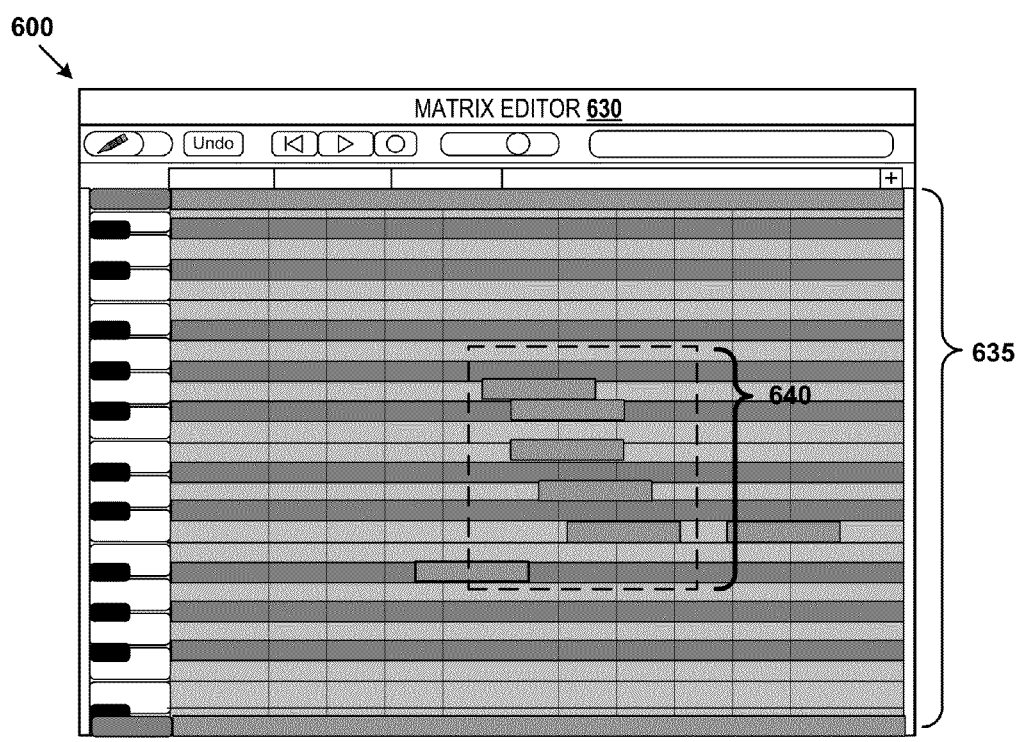

FIG. 6D illustrates that after the user releases the finger against the touch-sensitive display (e.g., display 105 in FIG. 1), the second reference grid 640 is shifted against the first reference grid 635 to the location in the matrix grid directed by the user in FIG. 6C. As shown, the relative location or the spatial relationship between the note events within the subset is maintained. In some embodiments, shifting the second reference grid against the first reference grid allows the user to move the note events within the second reference grid to any location within matrix grid without being limited to an alignment operation (that aligns the note events to particular quantized grids or locations). The alignment or the snap operation in some embodiments snaps note events to time values shown in the bar ruler. Using grid-edit operation as shown in FIG. 6, note events within the note events grid can be shifted freely to another location within the matrix grid without being locked to a discrete or quantized location while the note events can maintain their spatial relationship with respect to each other.

In some embodiments, as the user shifts the second reference grid against the first reference grid to a particular location, matrix editor can snap the second reference grid against a nearest musical bar, a nearest beat, etc. within the first reference grid. This alignment operation can be configured to align or snap a particular note event (e.g., the first note event) within the subset of note events against the nearest musical bar, beat, etc. Some embodiments enable the user to override this alignment operation upon user indication (e.g., selecting a button, sliding a slider, etc.).

While FIGS. 6A-6D illustrates shifting a note events grid against a matrix grid in a particular diagonal direction, different embodiments can shift the note events grid against the matrix grid in any direction. In response to receiving a user indication to shift the note events grid, the matrix editor can shift the note events grid horizontally across the matrix grid to change a location within the musical piece that the subset of note events (on the note events grid) is played. As such, the temporal relationship between each note within the subset of notes can be maintained. Further, in response to receiving an indication to move the note events grid against the matrix grid includes shifting the note events grid vertically across the matrix grid to pitch shift the subset of note events within the musical piece.

As described, the note events grid is capable of being shifted to any location within the matrix grid without being locked to a discrete or quantized location in the matrix grid. As such, the note events grid (and the note events included in the note events grid) is not limited or undesirably snapped to a particular location within the matrix grid.

Figure 7:
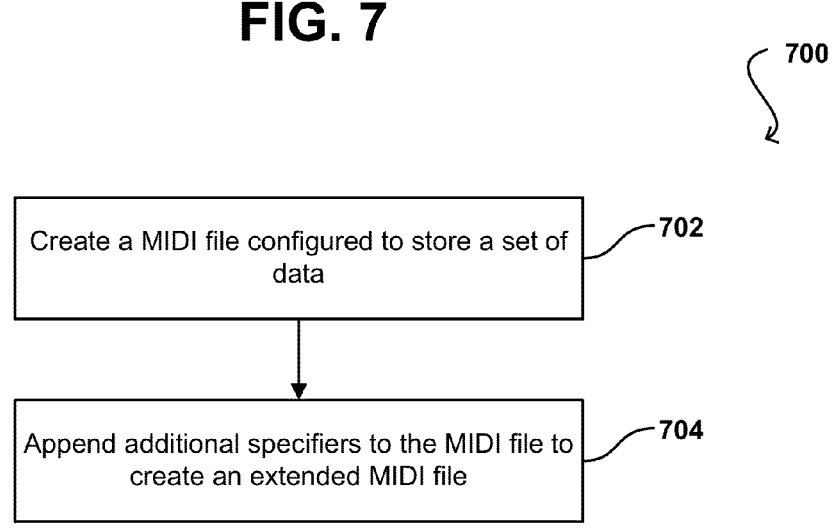
FIG. 7 illustrates an example process of some embodiments for extending MIDI capabilities such that a note event in a music editing application can be associated with a large number of unique characteristics.

FIG. 7 illustrates an example process 700 of some embodiments for extending MIDI capabilities such that a note event in a music editing application can be associated with a large number of unique characteristics. Process 700 can be implemented, for example, in system 100 of FIG. 1 executing editor code 125 to run music editing application in some embodiments.

At block 702, music editing application creates a MIDI file configured to store a first set of data. At block 704, music editing application appends several additional specifiers (also referred to as tags) to the MIDI file to create an extended MIDI file. In some embodiments, the additional tags (e.g., an instrument tag, an articulation tag) can be configured to store an additional set of data compared to the data in standard MIDI files. Some embodiments can have 128 additional tags.

Figure 8:
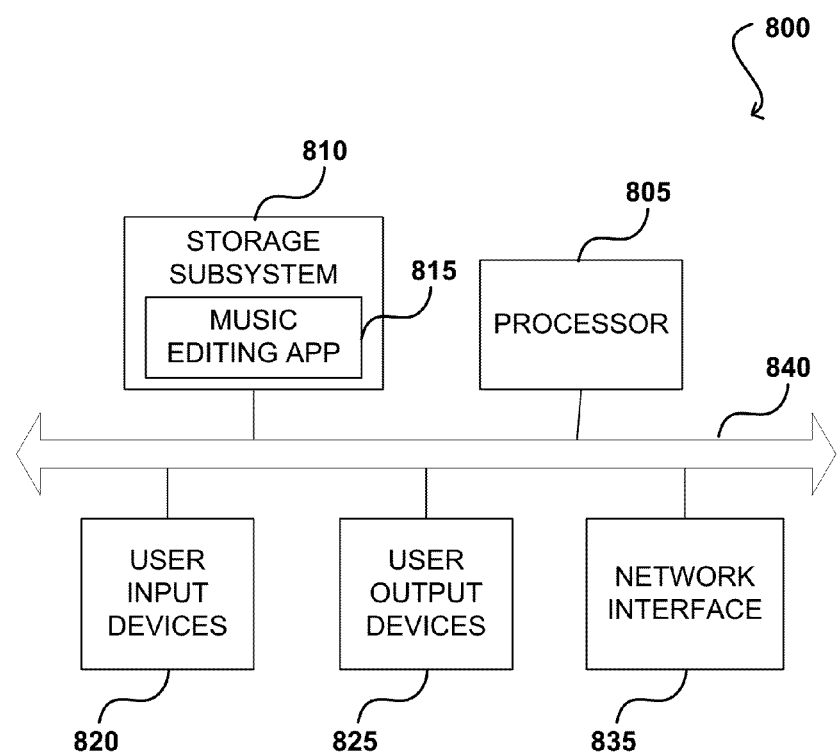
FIG. 8 illustrates a computer system according to an embodiment of the present invention.

FIG. 8 illustrates a computer system 800 according to an embodiment of the present invention. Music editing system 100 can be implemented within a computer system such as computer system 800 shown here. Computer system 800 can be implemented as any of various computing devices, including, e.g., a desktop or laptop computer, tablet computer, smart phone, personal data assistant (PDA), or any other type of computing device, not limited to any particular form factor. Computer system 800 can include processing unit(s) 805, storage subsystem 810, input devices 820, output devices 825, network interface 835, and bus 840.

Processing unit(s) 805 can include a single processor, which can have one or more cores, or multiple processors. In some embodiments, processing unit(s) 805 can include a general-purpose primary processor as well as one or more special-purpose co-processors such as graphics processors, digital signal processors, or the like. In some embodiments, some or all processing units 805 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 805 can execute instructions stored in storage subsystem 810.

Storage subsystem 810 can include various memory units such as a system memory, a read-only memory (ROM), and a permanent storage device. The ROM can store static data and instructions that are needed by processing unit(s) 805 and other modules of electronic device 800. The permanent storage device can be a read-and-write memory device. This permanent storage device can be a non-volatile memory unit that stores instructions and data even when computer system 800 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 810 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 810 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 810 can store one or more software programs to be executed by processing unit(s) 805, such as a music editing application 815. As mentioned, "software" can refer to sequences of instructions that, when executed by processing unit(s) 805 cause computer system 800 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 810, processing unit(s) 805 can retrieve program instructions to execute and data to process in order to execute various operations described herein.

A user interface can be provided by one or more user input devices 820, display device 825, and/or and one or more other user output devices (not shown). Input devices 820 can include any device via which a user can provide signals to computing system 800; computing system 800 can interpret the signals as indicative of particular user requests or information. In various embodiments, input devices 820 can include any or all of a keyboard touch pad, touch screen, mouse or other pointing device, scroll wheel, click wheel, dial, button, switch, keypad, microphone, and so on.

Output devices 825 can display images generated by electronic device 800. Output devices 825 can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like), indicator lights, speakers, tactile "display" devices, headphone jacks, printers, and so on. Some embodiments can include a device such as a touchscreen that function as both input and output device.

In some embodiments, output device 825 can provide a graphical user interface, in which visible image elements in certain areas of output device 825 are defined as active elements or control elements that the user selects using user input devices 820. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in output device 825. Other user interfaces can also be implemented.

Network interface 835 can provide voice and/or data communication capability for electronic device 800. In some embodiments, network interface 835 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 835 can provide wired network connectivity (e.g., Ethernet) in addition to or instead of a wireless interface. Network interface 835 can be implemented using a combination of hardware (e.g., antennas, modulators/demodulators, encoders/decoders, and other analog and/or digital signal processing circuits) and software components.

Bus 840 can include various system, peripheral, and chipset buses that communicatively connect the numerous internal devices of electronic device 800. For example, bus 840 can communicatively couple processing unit(s) 805 with storage subsystem 810. Bus 840 also connects to input devices 820 and display 825. Bus 840 also couples electronic device 800 to a network through network interface 835. In this manner, electronic device 800 can be a part of a network of multiple computer systems (e.g., a local area network (LAN), a wide area network (WAN), an Intranet, or a network of networks, such as the Internet. Any or all components of electronic device 800 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 805 can provide various functionality for electronic device 800. For example, processing unit(s) 805 can execute music editing application 845. Music editing application 845 can provide various functionality such as the ability to compose and edit performance data and various tools to enable a user to do so. For example, media editing application such as matrix editor can allow a user to associate a note event with various characteristics such as an instrument (e.g., guitar, piano, violin, etc.).

It will be appreciated that computer system 800 is illustrative and that variations and modifications are possible. Computer system 800 can have other capabilities not specifically described here (e.g., mobile phone, global positioning system (GPS), power management, one or more cameras, various connection ports for connecting external devices or accessories, etc.). Further, while computer system 800 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 9:
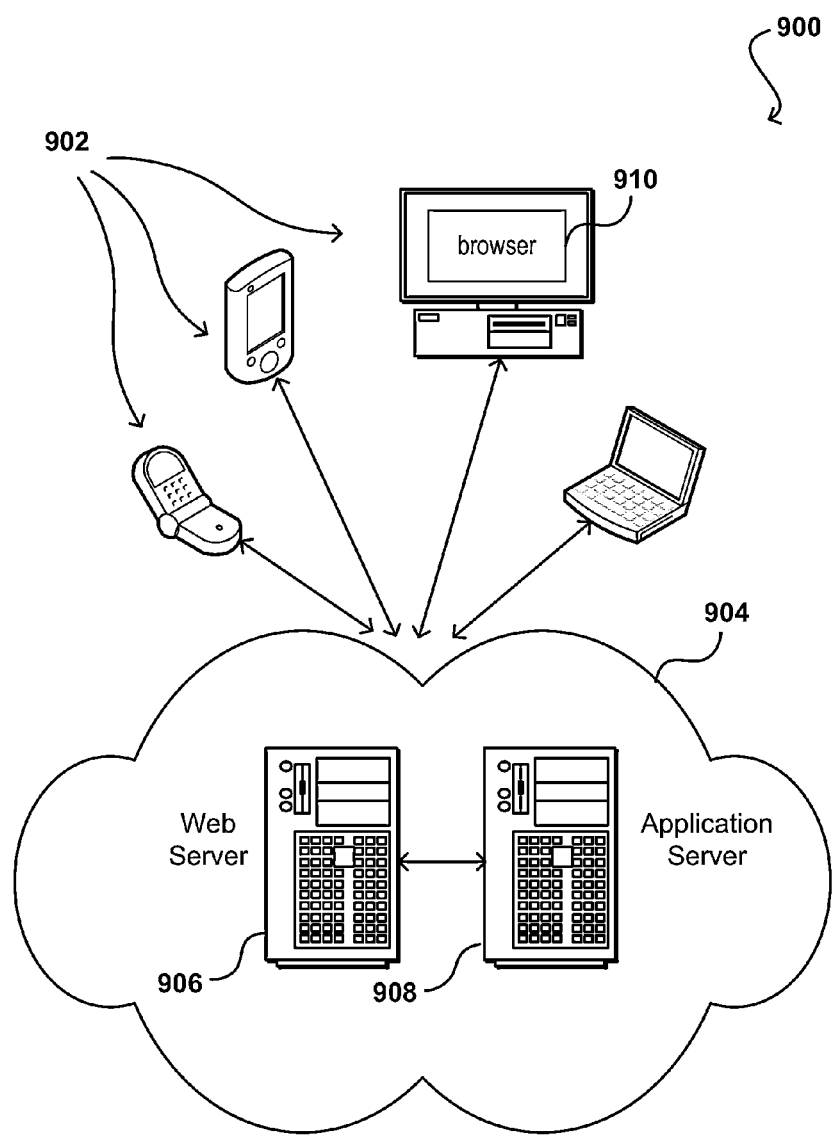
FIG. 9 illustrates an example of an environment that can implement various aspects of the present invention.

Different approaches can be implemented in various environments in accordance with the described embodiments. FIG. 9 illustrates an example of an environment 900 that can implement various aspects of the present invention. Although a Web-based environment is used for purposes of explanation, one of ordinary skill would recognize that different environments can be used to implement various embodiments of the invention.

Environment 900 includes an electronic client device 902, a Web server 906, and at least one application server 908. Electronic client device 902 can include any appropriate electronic device operable to send and receive requests, messages, and/or data over a network and convey information to a user of the device. Examples of such client devices include personal computers, mobile phones, laptop computers, personal data assistances and the like. Electronic client device 902 can communicate with a Web server 906 through at least one network where Web server 906 can receive requests from electronic client device 902 and serve content in response to communications over the network.

One of ordinary skill would recognize that there can be several application servers, layers or other elements, processes or components, which can be linked or otherwise configured and can interact to perform tasks such as obtaining data from a data store (e.g., one or more devices capable of storing, accessing, and retrieving data, such as one or more data servers, databases, data storage devices, and/or data storage media). Application server(s) 908 can include hardware and/or software to execute aspects of one or more applications for the client device and is capable of generating content such as text, graphics, audio and/or video to be sent to the user through Web server 906 in the form of HTML, XML, or any other appropriate structured language. The handling of all requests and responses, as well as the delivery of content between client device 902 and application server 908, can be handled by Web server 906. It should be understood that Web and application servers are not required and are merely examples components of environment 900.

In some embodiments, Web server 906 can run any of a variety of server or mid-tier applications, including HTTP servers, FTP servers, CGI servers, data servers, Java servers and business application servers. Web server(s) 906 can also be capable of executing programs or scripts in response to requests from client device 902, such as by executing one or more Web applications that can be implemented as one or more scripts or programs written in any programming language, such as Java®, C, C# or C++ or any scripting language, such as Perl, Python or TCL, as well as combinations thereof.

Each of the client devices 902 can include a display 910 where messages and/or data received over a network can be locally rendered and displayed to the user. While a user interface (e.g., GUI 120 of display 105 in FIG. 1) can display content to the user and allow a user to edit characteristics associated with a note event, processing can be performed "in the cloud" 904 via Web server 906 and one or more application servers 908 in some embodiments. For example, audio editing application can be running remotely "in the cloud" 904. Environment 900 can be a distributed computing system using several computer systems and components interconnected through various communication links (e.g., computer networks).

Although the invention has been described with respect to specific embodiments, it will be appreciated that the invention is intended to cover all modifications and equivalents within the scope of the following claims.

What is claimed is:

1. A method comprising:
   displaying, by a computing device, a set of note events on a matrix grid, the set of note events being a portion of a musical piece;
   receiving a selection of a subset of note events in the set of note events and placing the subset of note events on a note events grid, wherein the note events grid overlaps the matrix grid and is movable with respect to the matrix grid,
   receiving an indication to move the note events grid against the matrix grid; and
   adjusting a location of the subset of note events against remaining note events in the set of note events on the matrix grid, wherein a spatial relationship among the note events within the subset of note events is maintained.

2. The method of claim 1, wherein the matrix grid includes guide markers that includes one or more of beat markers, musical bar markers, event indicators, or note length markers.

3. The method of claim 1, wherein the computing device includes a touch-sensitive display that enables user interaction with the set of note events on the matrix grid via the touch-sensitive display.

4. The method of claim 1, wherein the note events grid is capable of being shifted to any location within the matrix grid without being locked to a discrete or quantized location in the matrix grid.

5. The method of claim 1, wherein receiving an indication to move the note events grid against the matrix grid includes shifting the note events grid horizontally across the matrix grid to change a location within the musical piece that the subset of note events is played.

6. The method of claim 5, wherein a temporal relationship between each note within the subset of note events is maintained.

7. The method of claim 1, wherein receiving an indication to move the note events grid against the matrix grid includes shifting the note events grid vertically across the matrix grid to pitch shift the subset of note events within the musical piece.

8. The method of claim 1, wherein the note events grid is capable of locking into one of a plurality of discrete or quantized locations on the matrix grid.

9. A computer readable storage medium encoded with program instructions that, when executed, cause a processor in a computing device to execute a method comprising:
   displaying a set of note events on a matrix grid, the set of note events being a portion of a musical piece;
   receiving a selection of a subset of note events in the set of note events and placing the subset of note events on a note events grid, wherein the note events grid overlaps the matrix grid and is movable with respect to the matrix grid,
   receiving an indication to move the note events grid against the matrix grid; and
   adjusting a location of the subset of note events against remaining note events in the set of note events on the matrix grid, wherein a spatial relationship among the note events within the subset of note events is maintained.

10. The computer readable storage medium of claim 9, wherein the matrix grid includes guide markers that comprises one or more of beat markers, musical bar markers, event indicators, or note length markers.

11. The computer readable storage medium of claim 9, wherein the note events grid is configured to lock into one of a plurality of discrete or quantized locations on the first reference grid.

12. The computer readable storage medium of claim 9, wherein the matrix grid includes a plurality of discrete or quantized locations evenly spaced across the matrix grid and wherein the note events grid is capable of being shifted against the matrix grid without being snapped to one of the plurality of discrete or quantized locations within the matrix grid.

13. The computer readable storage medium of claim 9, wherein the subset of note events includes at least two note events, wherein in response to receiving the indication to move the note events grid against the matrix grid, the spatial distance between the two note events remains the same.

14. An electronic device comprising:
   at least one processor; and
   a memory device coupled to the processor, the memory device including instructions to be executed for operating a MIDI-based matrix editor, wherein the instructions, when executed by the processor, cause the processor to:
      display a set of note events on a matrix grid, the set of note events being a portion of a musical piece;
      receive a selection of a subset of note events in the set of note events and placing the subset of note events on a note events grid, wherein the note events grid overlaps the matrix grid and is movable with respect to the matrix grid,
      receive an indication to move the note events grid against the matrix grid; and
      adjust a location of the subset of note events against remaining note events in the set of note events on the matrix grid, wherein a spatial relationship among the note events within the subset of note events is maintained.

15. The electronic device of claim 14, wherein the matrix grid includes a plurality of horizontal grid lines that represents a plurality of musical pitches and a plurality of vertical grid lines that represents a plurality of time parameters.

16. The electronic device of claim 14, wherein each note event in the set of note events is represented as a block in the matrix grid, wherein each note event has a height corresponding to a pitch.

17. The electronic device of claim 14, wherein the matrix grid includes guide markers that comprises one or more of beat markers, musical bar markers, event indicators, or note length markers.

18. The electronic device of claim 14, wherein the indication to move the note events grid against the matrix grid is a drag motion that drags the note events grid across the matrix grid and a release motion that indicates a location within the musical piece that a user desires to situate the subset of note events.

19. The electronic device of claim 14, wherein the matrix grid is fixedly displayed on the matrix editor.

20. The electronic device of claim 14, wherein at least one of the set of note events is associated with a set of tags including an instrument tag and an articulation tag for the note event.

* * * * *